April 23, 1957 L. D. HUFFMAN 2,789,648
POWER OPERATED MATERIAL HANDLING TRUCKS
Filed Feb. 24, 1955 4 Sheets-Sheet 1

INVENTOR.
Levi D. Huffman
BY
Attorney.

April 23, 1957 L. D. HUFFMAN 2,789,648
POWER OPERATED MATERIAL HANDLING TRUCKS
Filed Feb. 24, 1955 4 Sheets-Sheet 2

INVENTOR.
Levi D. Huffman

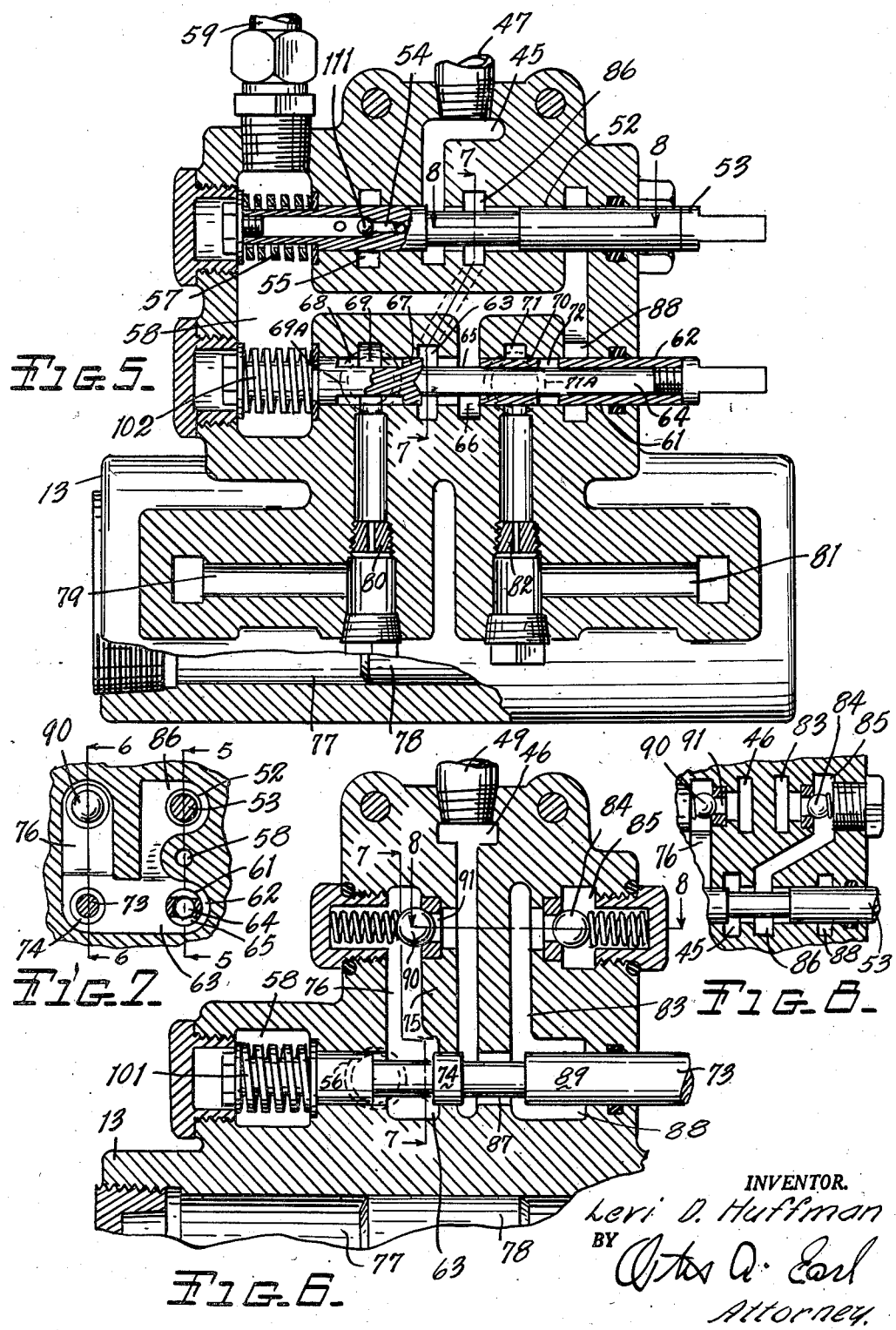

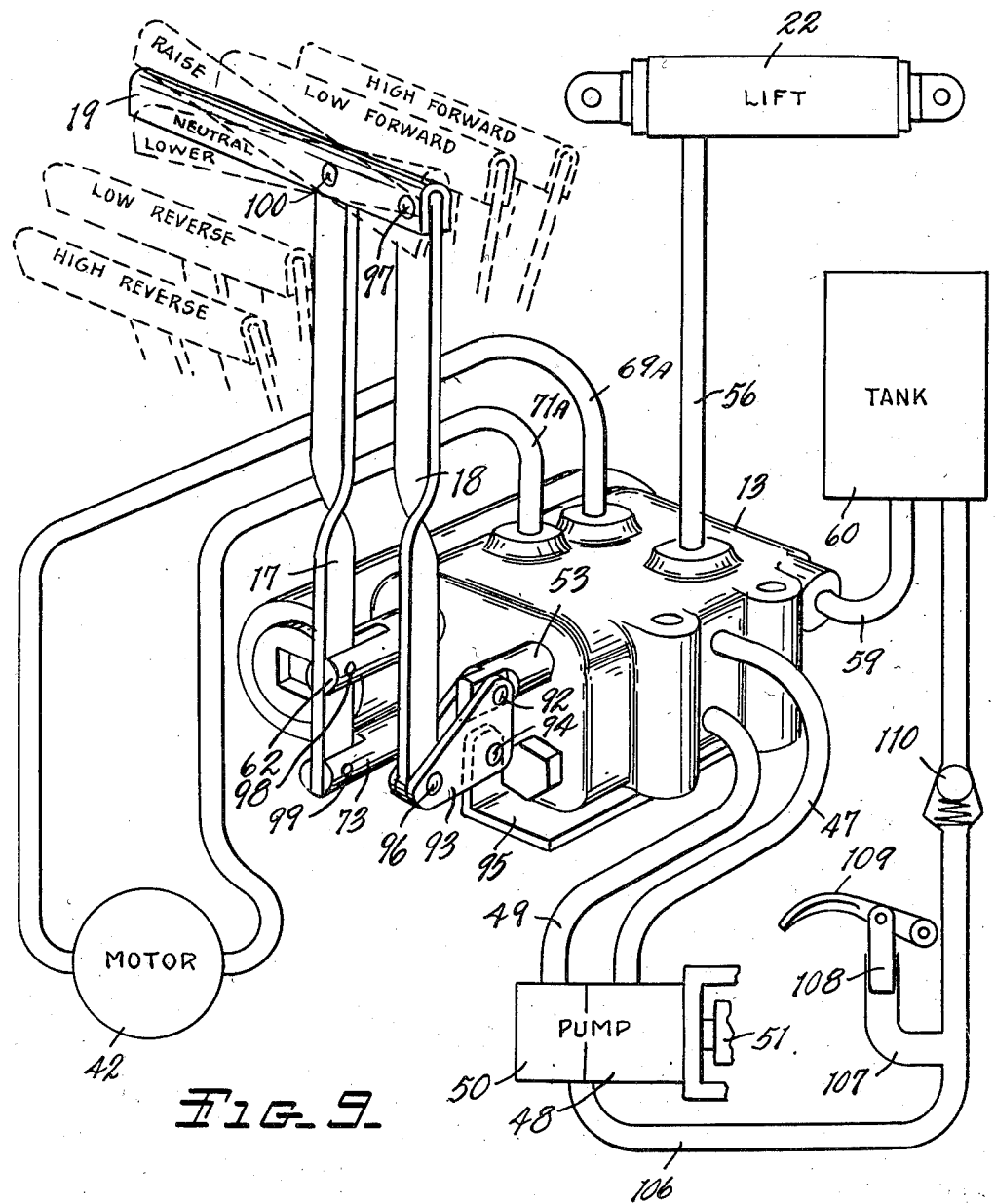

United States Patent Office 2,789,648
Patented Apr. 23, 1957

2,789,648

POWER OPERATED MATERIAL HANDLING TRUCKS

Levi D. Huffman, Grafton, Ohio, assignor to The Colson Corporation, Elyria, Ohio Application February 24, 1955, Serial No. 490,177

17 Claims. (Cl. 180—66)

This invention relates to improvements in power operated material handling trucks. The principal objects of this invention are:

First, to provide a gasoline engine operated industrial truck of the type having a liftable load platform for moving boxes and pallets which truck is simple and relatively inexpensive to manufacture and maintain and which has extremely flexible operating characteristics.

Second, to provide an industrial truck of the type described in which a single control lever will operate the speed and direction of travel of the truck and the elevation of the load supporting platform.

Third, to provide a drive unit for an industrial truck in which a hydraulically driven drive wheel is steerably mounted on the frame of the unit and connected to a gasoline engine operated pump fixedly mounted in the unit by flexible conduits so that the driving connections between the power source and the steerable driving wheel are extremely simple.

Fourth, to provide an industrial truck with a gasoline engine operated source of hydraulic pressure and a hydraulically driven drive wheel with a manually operable pump connected to the hydraulic system to act as a starter for the engine.

Fifth, to provide a novel control valve assembly which permits a single control lever to control the lifting operation of the truck and the forward and reverse motion of the truck at two speeds.

Other objects and advantages of the invention will be apparent from a consideration of the following description and claims. The drawings of which there are four sheets illustrate a highly practical form of the engine.

Fig. 5 is a horizontal cross sectional view through the control valve of the truck taken along the plane of the line 5—5 in Figs. 1 and 7.

Fig. 6 is a horizontal cross sectional view through the lower portion of the control valve taken along the plane of the line 6—6 in Figs. 1 and 7.

Fig. 7 is a fragmentary transverse cross sectional view through the control rods of the valve assembly taken along the plane of the line 7—7 in Fig. 6.

Fig. 8 is a fragmentary vertical cross sectional view through the control valve taken along the plane of the line 8—8 in Fig. 6.

Fig. 9 is a perspective view of the control valve with the hydraulic connections of the truck system conventionally illustrated.

Figures 1, 2:
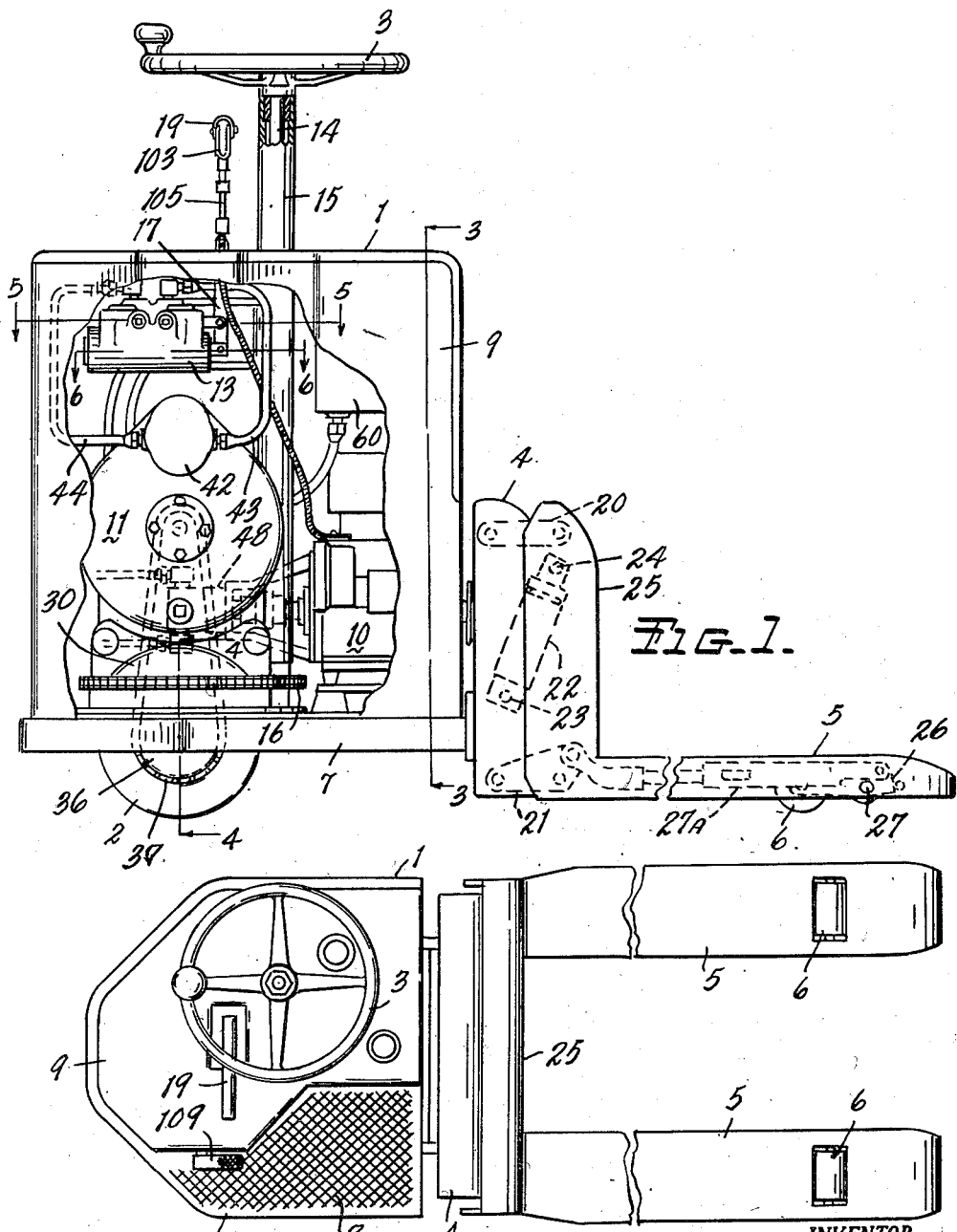
Fig. 1 is a side elevational view of the truck with portions thereof broken away.
Fig. 2 is a plan view of the truck.

As is best illustrated in Figs. 1 and 2 the truck comprises generally a power unit 1 having a steerable driving wheel 2 and a steering wheel 3. The power unit is removably and fixedly connected at one end to a lift unit 4 which is in turn connected to a load supporting platform 5 having supporting and balance wheels 6. The power unit 1 includes a base or frame 7 having an operator's platform 8 and a suitable housing 9 enclosing an internal combustion engine 10, drive unit 11 and control valve 13. The steering wheel 3 has a steering shaft 14 extending downwardly through the column 15 and provided with a pinion on its lower end engaging a chain 16 secured around the lower end of the drive unit 11. The valve 13 is controlled by a pair of levers 17 and 18 that extend upwardly above the housing 9 to a single control lever 19. The load supporting and lifting units 4 and 5 consist of suitable frame works having upper links 20 and lower links 21 pivotally connected therebetween. A fluid pressure operated lift cylinder 22 is mounted in inclined position with one end connected to the fixed frame of the lift unit 4 as at 23 and with its other end pivotally connected at 24 to an upright arm 25 at the end of the load supporting platform 5. As will be understood extension of the lift cylinder 22 and its piston will raise the load platform 5 as the links 20 and 21 swing about their pivotal connection to the lift unit. The balance wheels 6 are carried by arms 26 pivotally connected to the load platform at 27. Links 27A connected between the arms 26 and the lower links 21 function to move the balancing wheels downwardly as the lift platform is raised.

Figure 3:
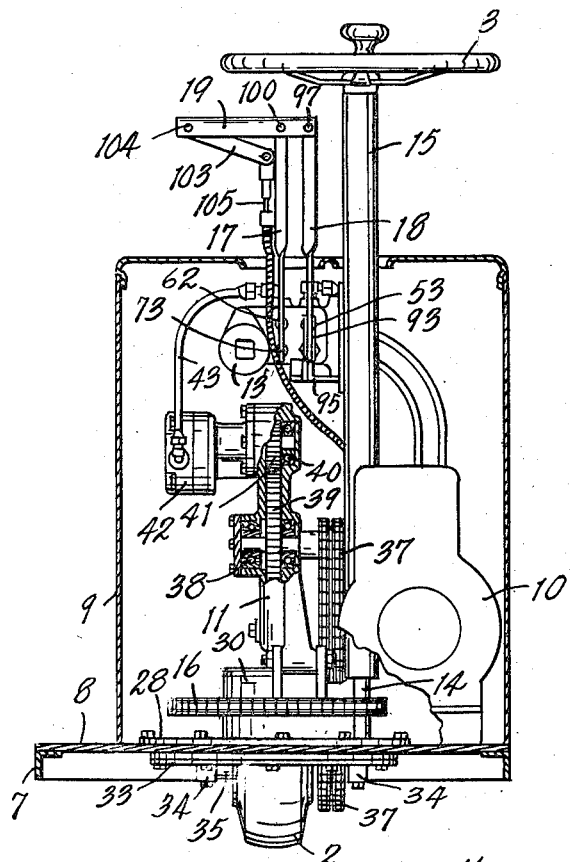
Fig. 3 is a vertical cross sectional view taken along the plane of the line 3—3 in Fig. 1 and illustrates the mounting of the drive unit of the truck.
Figure 4:
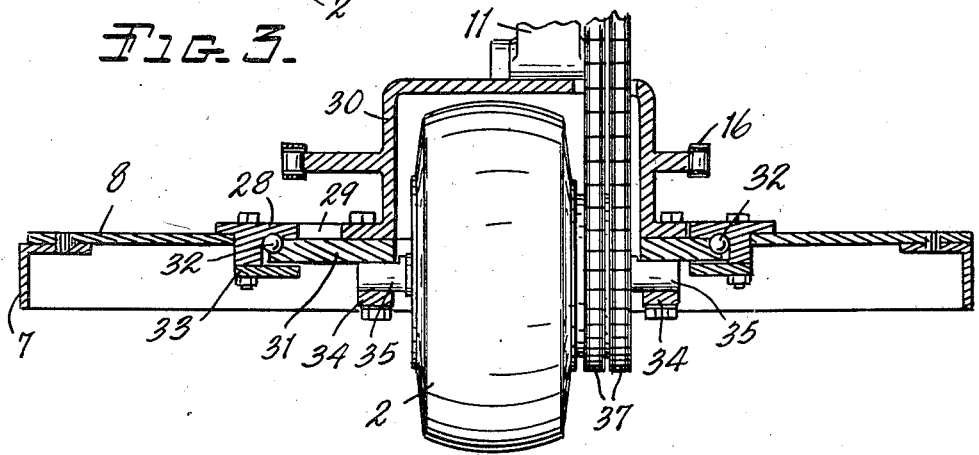
Fig. 4 is a fragmentary vertical cross sectional view through the drive unit mounting and wheel taken along the plane of the line 4—4 in Fig. 1.

The power unit is disclosed in greater detail in Figs. 3 and 4 where it will be noted that the base 7 carries an annular bearing plate 28 defining a circular opening 29 centrally of the power unit. The driving unit 11 includes a housing having a circular lower portion 30 extending into the opening 29 and provided with a radially projecting rim 31 underlying the annular bearing plate 28. Ball bearings 32 rotatably support the rim 31 with respect to the bearing plate and a retaining ring 33 secured to the bottom of the bearing ring prevents disengagement of the drive unit housing from the bearing plate. The under side of the rim 31 on the drive unit housing carries bearings 34 that rotatably receive the ends of the axle 35 of the drive wheel 2. The drive wheel 2 is provided with sprockets 36 connected by chains 37 with reduction gearing in the drive unit housing as will be described.

The upper part of the drive unit housing 11 includes bearings 38 for a large reduction gear 39 and bearings 40 for a small drive pinion 41. The pinion 41 meshes with the gear 39 and the chains 37 are trained over sprockets on the external end of the shaft of the large gear. Secured to the upper end of the drive unit housing is a hydraulic motor 42 having its shaft connected to the shaft of the driving pinion 41. The motor 42 is of the positive displacement pressure operated type and is supplied with fluid pressure alternatively through the flexible conduits 43 and 44. Depending upon the direction of travel of the truck and rotation of the motor 42 fluid pressure is supplied through one of the conduits 43 or 44 and returned through the other. During operation of the truck the entire drive unit 11 rotates on the bearings 32 to steer the truck.

The construction and operation of the valve assembly 13 that controls operation of the truck is best illustrated in Figs. 5 to 9. The housing of the valve assembly is cored or machined to provide an upper inlet chamber 45 and a lower inlet chamber 46. The upper chamber 45 is connected by means of a first supply pipe 47 to the output side of a positive displacement pump 48 and the lower inlet chamber 46 is connected by the conduit 49 to a second displacement pump 50. The pumps 48 and 50 are coaxially arranged and directly drivingly connected to the drive shaft 51 of the internal combustion engine 10.

The upper portion of the valve housing 13 shown in cross section in Fig. 5 is provided with a transverse bore 52 slidably receiving the lift control valve plunger 53. The bore 52 intersects the upper inlet chamber 45 and the plunger 53 is provided with a port 54 that affords communication between the chamber 45 and a passage 55 when the plunger 53 is drawn outwardly or to the right as shown in Fig. 5. The passage 55 connects with a conduit 56 extending to the lift cylinder 22. When the plunger 53 is in neutral position the port 54 is closed off and the lift cylinder remains stationary. When the plunger 53 is pressed inwardly against the compression of the coil spring 57, the port 54 affords communication between the passage 55 and an exhaust passage 58 in the valve housing. The exhaust passage 58 is connected by the conduit 59 to a reservoir tank 60 for the hydraulic system.

The upper portion of the valve housing is also provided with a second transverse bore 61 slidably receiving the direction control valve plunger rod 62. The bores 52 and 61 are interconnected by a cored passage 63 (see Fig. 7) so that pressure from the inlet chamber 45 is supplied to the bore 61. The valve plunger rod 62 is bored as at 64 and milled away on the side at 65. In the neutral position of rod 62 illustrated the milled area 65 affords communication between the end of passage 63 and a branch 66 of the return passage 58. When the rod 62 is pulled out, the full uncut portion 67 of the rod closes off the passage 63 from the return passage 66 and the milled area 68 affords communication between the passage 63 and a chamber 69 opening upwardly to the supply pipe 69A which may be designated the reverse drive supply pipe.

Inward motion of the valve rod 62 causes the milled area 68 to vent the chamber 69 and pipe 69A directly to the return passage 58 while the unmilled but bored portion 70 closes off the branch return passage 66 and connects the supply passage 63 to a chamber 71 opening through the top of the housing to the forward drive delivery pipe 71A through a third milled area 72. The pipe 71A is of necessity vented to the return passage 66 when the rod is pulled out. The rod 62 is thus arranged to selectively connect the supply pipes 69A and 71A to the supply passage 63 and chamber 45 and to vent the other pipe. When the rod moves to neutral closing the return vents from the motor, the motor is first slowed by the restriction of its outlet and then positively locked to act as a brake for the truck.

The lower portion of the valve casing is transversely bored to receive a speed control valve rod 73 that intersects the second supply chamber 46. Either inward or outward movement of the rod 73 moves the valve portion 74 through the partition wall 75 and affords communication between the inlet chamber 46 and the chamber 76. Chamber 76 is cored upwardly and communicates with the previously described chamber 63 (see Fig. 7) so that when the rod 73 is pushed in or pulled out the output of the pump 50 is added to the output of pump 48 for high speed operation of motor 42 in either direction as determined by the setting of the upper valve rod 62 as previously described.

The starting movement of the motor 42 is cushioned or made less abrupt by a cushioning cylinder 77 formed in the end of the valve housing. The cylinder has a piston 78 freely slidably or floatingly mounted therein. One end of the cylinder is open through the passage 79 to an interchangeable orifice plug 80 and from there to the chamber 69. The other end of the cylinder 77 is open through the passage 81 to a second interchangeable orifice plug 82 and from there to the chamber 71. When oil pressure is admitted to the chamber 69 to start the motor reversely the full power of the pump is not immediately applied through the pipe 69A but instead part of the oil delivered is directed through the orifice plug 80 to move the piston 78 to the right. The speed with which the piston moves is determined by the size of the orifice in plug 80 and by the size of the orifice in plug 82 through which oil is ejected by the moving piston. During the time in which the piston is moving to the far end of the cylinder the motor is brought gradually up to speed. Operation of the motor forwardly is similarly cushioned by reverse action of the piston 78 as is stopping or braking action.

The valve assembly is arranged to permit braking action when the truck runs down an incline and tends to drive the motor 42 faster than the pumps 48 and to supply oil to the motor. For this purpose the secondary inlet chamber 46 is connected through the cored passage 83 to one side of a spring pressed anti-cavitation ball valve 84 (see Figs. 6 and 8). The other side of the valve 84 opens to a passage 85 that communicates with the chamber 86 around the lift valve plunger rod 53. As appears in Figs. 5 and 8, this chamber 86 communicates with the inlet chamber 45 so that if the motor tends to draw more oil than is supplied by the pipe 47 to the chamber 86, the valve 84 will open and draw additional oil from the pipe 49 through the chambers 46 and 83.

The output of the secondary pump 50 and the inlet chamber 46 are vented to the return passage 58 when the speed control rod 73 is in neutral position as shown in Fig. 6. This vent is formed through the port 87 and chamber 83 that opens upwardly to the branch chamber 88 around the direction control rod 62 and from thence to the return passage 58. In order to cut off this return passage when the output of the secondary pump is to be utilized the valve portion 74 blocks the port 87 when the speed control valve is pulled out and the thicker outer portion 89 of the rod closes the port 87 when the rod is pushed in. In order to prevent the closing of the port 87 by the outer end 89 of the valve rod from placing a direct block in the output of the secondary pump before the valve 74 opens to the passage 76, a spring pressed ball valve 90 opens momentarily to open the by-pass port 91 between the inlet passage 46 and the passage 76.

The valve rods 53, 62 and 73 of the valve assembly are controlled by the single handle or control lever 19 as is more clearly illustrated in Fig. 9. The lift control rod 53 is pivotally connected at its outer end 92 to a crank 93 that is in turn pivotally connected at 94 to a fixed support 95 on the bottom of the valve housing. The control lever 18 is pivotally connected to the crank at 96 and extends upwardly to a pivotal connection 97 at the end of the handle 19. The valve rods 62 and 73 have their outer ends pivotally connected in spaced relationship as at 98 and 99 to the lower end of the lever 17. The upper end of the lever 17 is pivotally connected at 100 to an intermediate portion of the handle 19. It will thus be seen that the pivot 100 is fixed vertically by the spaced pivots 98 and 99 so that raising and lowering of the handle 19 will result in lowering and raising respectively the outer end of the crank 93. This in turn will result in pulling the lift control valve rod 53 outwardly or pressing it downwardly of the valve to raise or lower the lift cylinder 22 as was previously described. Lateral swinging motion of the handle 19 and the lever 18 will have no effect on the lift control valve as the lever 18 is free to swing laterally on the pivot 96.

Lateral swinging motion of the handle 19 and the lever 17 as shown in Fig. 9 will necessarily result in movement of one or both of the valve rods 62 and 73. Movement of these rods is determined and regulated by the relative strengths of the spring 101 and the spring 102 (see Figs. 5 and 6). The spring 101 backs up and biases the lower speed control valve rod 73 outwardly and is relatively heavy or stiff as compared to spring 102 which backs up and biases the direction control rod 62 outwardly of the valve housing. The lower pivot 99 is therefore relatively fixed so that initial lateral movement of the handle 19 either to right or left will result first in movement of the direction control valve rod 62 in or out to connect the output of the primary pump 48 to the motor 42 for either forward or reverse drive as has been explained. As soon as the direction control valve rod 62 reaches the limit of its inward or outward motion the pivot 98 becomes relatively fixed and further lateral swinging of the handle 19 in either direction will result in inward or outward movement of the speed control valve rod 73 to add the output of the secondary pump 50 to the output of the primary pump and high speed operation of the motor. The single control handle 19 is thus operative to control the movements of the truck for forward or reverse motion at low or high speeds and to raise or lower the load supporting platform and to brake the truck.

For still greater speed control of the truck the handle 19 is provided as is shown in Fig. 3 with a grip lever 103 pivoted at 104 and having its swinging end connected to a control cable 105 that extends to the throttle of the engine 10.

A further advantage of the hydraulic drive system disclosed is that the supply conduit 106 from the reservoir tank 60 to the pumps 48 and 50 may be provided with a connection 107 to an externally operable piston 108. The piston 108 may be positioned in any location convenient to the operator and provided with a foot pedal 109 for starting the engine 10. A check valve 110 in the conduit 106 between the tank and the pumps prevents pressure created by the piston 108 from traveling back to the tank 60 and the pressure is available to turn the pumps 48 and 50. The pumps being directly connected to the engine 10 act as starting motors to start the engine.

A feature of the lift control valve rod 53 is the provision of a spring biased ball check valve 111 in the port 54 that prevents fluid from the lift cylinder 22 from leaking back into the chamber 45 should the pumps stop when the lift cylinder is in the process of lifting the load supporting platform. The check valve 111 is inoperative when the lift valve control rod is in neutral position and it opens when the lift valve is adjusted to lower the cylinder 22.

Since the valves 62 and 73 are spring biased to neutral position in which position the fluid motor 42 is locked, the handle has a dead man safety function of automatically stopping the truck should the operator fall off or relax his grip on the handle.

Having thus described the invention, what is claimed to be new and what is desired to be secured by Letters Patent is:

1. A power driven material moving and lifting truck comprising, a base having a gasoline engine, control valve and steering wheel mounted thereon, a load supporting and lifting unit removably connected to one end of said base and having a hydraulically operated lift cylinder and ground wheels to support and balance the truck, a drive unit including a ground engaging drive wheel and a hydraulically driven motor connected thereto rotatably and steerably connected in supporting relation to said base, means connecting said drive unit to said steering wheel, a pair of hydraulic pumps directly connected to said engine, supply conduits from said pumps to said control valve, delivery conduits from said control valve to said motor and said load unit lift cylinder, two of said delivery conduits to said motor being connected to oppositely operate said motor and drive wheel, a cushioning cylinder on said valve and having its opposite ends connected through restricted passages to said two of said delivery lines, a piston floatingly mounted in said cylinder between the connections at the ends thereof, and a single control handle on said valve adapted to selectively adjust the valve to connect one or both said supply conduits to either of said two delivery conduits and to connect a supply conduit to the delivery conduit to the lift cylinder.

2. A power driven material moving truck comprising, a base having a gasoline engine, control valve and steering wheel mounted thereon, a load supporting unit removably connected to one end of said base and having ground wheels to support and balance the truck, a drive unit including a ground engaging drive wheel and a hydraulically driven motor connected thereto rotatably and steerably connected in supporting relation to said base, means connecting said drive unit to said steering wheel, a pair of hydraulic pumps directly connected to said engine, supply conduits from said pumps to said control valve, delivery conduits from said control valve to said motor, two of said delivery conduits to said motor being connected to oppositely operate said motor and drive wheel, a cushioning cylinder on said valve and having its opposite ends connected through restricted passages to said two of said delivery lines, a piston floatingly mounted in said cylinder between the connections at the ends thereof, and a single control handle on said valve adapted to selectively adjust the valve to connect one or both said supply conduits to either of said two delivery conduits.

3. A power driven material moving and lifting truck comprising, a base having an internal combustion engine, control valve and steering wheel mounted thereon, a load supporting and lifting unit connected to one end of said base and having a hydraulically operated lift cylinder and ground wheels to support and balance the truck, a drive unit including a ground engaging drive wheel and a hydraulically driven motor connected thereto rotatably and steerably connected in supporting relation to said base, means connecting said drive unit to said steering wheel, a pair of hydraulic pumps drivingly interconnected with said engine, supply conduits from said pumps to said control valve, delivery conduits from said control valve to said motor and said load unit lift cylinder, two of said delivery conduits to said motor being connected to oppositely operate said motor and drive wheel, a single control handle on said valve adapted to selectively adjust the valve to connect one or both said supply conduits to either of said two delivery conduits and to connect a supply conduit to the delivery conduit to the lift cylinder, said handle having a throttle lever for said engine pivotally mounted thereon to be actuated by gripping action on the handle.

4. A power driven material moving truck comprising, a base having an internal combustion engine, control valve and steering wheel mounted thereon, a load supporting unit connected to one end of said base and having ground wheels to support and balance the truck, a drive unit including a ground engaging drive wheel and a hydraulically driven motor connected thereto rotatably and steerably connected in supporting relation to said base, means connecting said drive unit to said steering wheel, a pair of hydraulic pumps drivingly interconnected with said engine, supply conduits from said pumps to said control valve, delivery conduits from said control valve to said motor, said delivery conduits to said motor being connected to oppositely operate said motor and drive wheel, a single control handle on said valve adapted to selectively adjust the valve to connect one or both said supply conduits to either of said delivery conduits.

5. A power driven material moving and lifting truck comprising, a base having an internal combustion engine, control valve and steering wheel mounted thereon, a load supporting and lifting unit removably connected to one end of said base and having a hydraulically operated lifting cylinder and ground wheels to support and balance the truck, a drive unit including a ground engaging drive wheel and a hydraulically driven motor connected thereto rotatably and steerably connected in supporting relation to said base, means connecting said drive unit to said steering wheel, a pair of hydraulic pumps drivingly connected to said engine, a pair of supply conduits from said pumps to said control valve, delivery conduits from said control valve to said motor and said cylinder, two of said delivery conduits to said motor being connected to oppositely operate said motor and drive wheel, a single control handle on said valve adapted to selectively adjust the valve to connect one or both of said supply conduits to either of said delivery conduits to said motor and to connect one of said conduits to said cylinder, and a throttle lever for said engine pivotally mounted on said handle to be actuated by gripping action on the handle and lever.

6. In a power driven truck, a base, an internal combustion engine on said base and having a hydraulic pump connected to the engine to be driven thereby, a drive wheel rotatably mounted on a horizontal axis and projecting below said base, a hydraulic motor, a drive connection between said wheel and said motor, supply and return conduits connecting said pump to said motor, a control valve fixed relative to said base and connected in said supply conduit and having a handle to control the operation of said motor, a piston connected to create pressure in said return conduit, a foot pedal on said base connected to actuate said piston, a check valve between said piston and said motor whereby pressure created by the piston will drive the pump to start the engine, and a throttle control for said engine mounted on said handle.

7. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, an annular bearing on said base defining an opening in the base, a drive unit housing having an annular rim disposed in supporting relation to said bearing and rotatable with respect thereto, a drive wheel rotatably mounted on said housing on a horizontal axis and projecting below said base, a hydraulic motor on said housing, means to drive said wheel from said motor, means to rotate said housing, conduits connecting said pumps to said motor and said lift cylinder, a control valve fixed relative to said base and connected in said conduits to control the operation of said motor and said lift cylinder, said valve having a first inlet passage connected to a first of said pumps and a second inlet passage connected to the second of said pumps, a direction control valve rod slidable in said valve and intersecting said first inlet passage, two supply passages selectively connectable to said first passage by movement of said first valve rod to its oppositely actuated positions and connected by two of said conduits to opposite sides of said motor to oppositely drive said motor, said last two conduits being flexible, a speed control valve rod slidably mounted in said valve in spaced parallel relation to said first rod and intersecting said second passage, a connecting passage in said valve opened to said first inlet passage ahead of said first valve rod in oppositely actuated positions of said speed control valve rod, a return passage in said valve connected selectively by said direction control rod to the opposite supply passage from that opened to the first inlet passage by said direction control valve rod, a lift control valve rod slidably mounted in said valve and intersecting one of said inlet passages, a lift supply passage in said valve selectively connected to said one of said inlet passages and said return passage by actuation of said lift control valve rod, said lift supply passage being connected to said lift cylinder, a first lever pivotally connected at spaced points to the outer ends of said direction control and speed control valve rods and extending therebeyond, springs biasing the inner ends of said control valve rods to neutral position, one of said springs being stronger than the other whereby swinging motion of said lever will reciprocate first said direction control valve rod and will oppositely reciprocate said speed control valve rod after said direction control valve rod has moved to the limit of its actuated positions, a control handle pivoted on the end of said first lever, a second lever pivoted on said handle at a point spaced from said first lever, a crank fixedly pivoted on said valve and connected to said second lever for operation thereby, the end of said lift control valve rod being connected to said crank for operation thereby, a cushioning cylinder connected at its ends through restricted passages to said supply passages, a piston floatingly mounted in said cylinder, a return conduit from said return passage to the inlet of said pumps, a manually operable piston connected to said return conduit to create pressure therein, and a check valve in said return conduit between said piston and said valve whereby pressure created by said manually operable piston will actuate said pumps to start said engine.

8. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, an annular bearing on said base defining an opening in the base, a drive unit housing having an annular rim disposed in supporting relation to said bearing and rotatable with respect thereto, a drive wheel rotatably mounted on said housing on a horizontal axis and projecting below said base, a hydraulic motor on said housing, means to drive said wheel from said motor, means to rotate said housing, conduits connecting said pumps to said motor and said lift cylinder, a control valve fixed relative to said base and connected in said conduits to control the operation of said motor and said lift cylinder, said valve having a first inlet passage connected to a first of said pumps and a second inlet passage connected to the second of said pumps, a direction control valve rod slidable in said valve and intersecting said first inlet passage, two supply passages selectively connectable to said first passage by movement of said first valve rod to its oppositely actuated positions and connected by two of said conduits to opposite sides of said motor to oppositely drive said motor, said last two conduits being flexible, a speed control valve rod slidably mounted in said valve in spaced parallel relation to said first rod and intersecting said second passage, a connecting passage in said valve opened to said first inlet passage ahead of said first valve rod in oppositely actuated positions of said speed control valve rod, a return passage in said valve connected selectively by said direction control rod to the opposite supply passage from that opened to the first inlet passage by said direction control valve rod, a lift control valve rod slidably mounted in said valve and interesting one of said inlet passages, a lift supply passage in said valve selectively connected to said one of said inlet passages and said return passage by actuation of said lift control valve rod, said lift supply passage being connected to said lift cylinder, a first lever pivotally connected at spaced points to the outer ends of said direction control and speed control valve rods and extending therebeyond, springs biasing said control valve rods to neutral position, one of said springs being stronger than the other whereby swinging motion of said lever will reciprocate first said direction control valve rod and will oppositely reciprocate said speed control valve rod after said direction control valve rod has moved to the limit of its actuated positions, a control handle pivoted on the end of said first lever, a second lever pivoted on said handle at a point spaced from said first lever, a crank fixedly pivoted on said valve and connected to said second lever for operation thereby, the end of said lift control valve rod being connected to said crank for operation thereby, a cushioning cylinder connected at its ends through restricted passages to said supply passages, a piston floatingly mounted in said cylinder, and a return conduit from said return passage to the inlet of said pumps.

9. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, an annular bearing on said base defining an opening in the base, a drive unit housing having an annular rim disposed in supporting relation to said bearing and rotatable with respect thereto, a drive wheel rotatably mounted on said housing on a horizontal axis and projecting below said base, a hydraulic motor on said housing, means to drive said wheel from said motor, means to rotate said housing on said base to steer said truck, conduits connecting said pumps to said motor and said lift cylinder, a control valve fixed relative to said base and connected in said conduits to control the operation of said motor and said lift cylinder, said valve having a first inlet passage connected to a first of said pumps and a second inlet passage connected to the second of said pumps, a direction control valve rod slidable in said valve and intersecting said first inlet passage, two supply passages selectively connectable to said first passage by movement of said first valve rod to its oppositely actuated positions and connected by two of said conduits to opposite sides of said motor to oppositely drive said motor, said last two conduits being flexible, a speed control valve rod slidably mounted in said valve in spaced parallel relation to said first rod and intersecting said second passage, a connecting passage in said valve opened to said first inlet passage ahead of said first valve rod in oppositely actuated positions of said speed control valve rod, a return passage in said valve connected selectively by said direction control rod to the opposite supply passage from that opened to the first inlet passage by said direction control valve rod, a lift control valve rod slidably mounted in said valve and intersecting one of said inlet passages, a lift supply passage in said valve selectively connected to said one of said inlet passages and said return passage by actuation of said lift control valve rod, said lift supply passage being connected to said lift cylinder, a first lever pivotally connected at spaced points to the outer ends of said direction control and speed control valve rods and extending therebeyond, springs biasing said control valve rods to neutral position, one of said springs being stronger than the other whereby swinging motion of said lever will reciprocate first said direction control valve rod and will oppositely reciprocate said speed control valve rod after said direction control valve rod has moved to the limit of its actuated positions, a control handle pivoted on the end of said first lever, a second lever pivoted on said handle at a point spaced from said first lever, a crank fixedly pivoted on said valve and connected to said second lever for operation thereby, the end of said lift control valve rod being connected to said crank for operation thereby, and a return conduit from said return passage to the inlet of said pumps.

10. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, an annular bearing on said base defining an opening in the base, a drive unit housing having an annular rim disposed in supporting relation to said bearing and rotatable with respect thereto, a drive wheel rotatably mounted on said housing on a horizontal axis and projecting below said base, a hydraulic motor on said housing, means to drive said wheel from said motor, means to rotate said housing on said base to steer said truck, conduits connecting said pumps to said motor and said lift cylinder, a control valve fixed relative to said base and connected in said conduits to control the operation of said motor and said lift cylinder, said valve having a first inlet passage connected to a first of said pumps and a second inlet passage connected to the second of said pumps, a direction control valve rod slidable in said valve and intersecting said first inlet passage, two supply passages selectively connectable to said first passage by movement of said first valve rod to its oppositely actuated positions and connected by two of said conduits to opposite sides of said motor to oppositely drive said motor, said last two conduits being flexible, a speed control valve rod slidably mounted in said valve in spaced parallel relation to said first rod and intersecting said second passage, a connecting passage in said valve opened to said first inlet passage ahead of said first valve rod in oppositely actuated positions of said speed control valve rod, a return passage in said valve connected selectively by said direction control rod to the opposite supply passage from that opened to the first inlet passage by said direction control valve rod, a lift control valve rod slidably mounted in said valve and intersecting one of said inlet passages, a lift supply passage in said valve selectively connected to said one of said inlet passages and said return passage by actuation of said lift control valve rod, said lift supply passage being connected to said lift cylinder, a first lever pivotally connected at spaced points to the outer ends of said direction control and speed control valve rods and extending therebeyond, said lever extending on the opposite side of said direction control rod from said speed control rod whereby swinging motion of said lever will reciprocate first said direction control valve rod and will oppositely reciprocate said speed control valve rod after said direction control valve rod has moved to the limit of its actuated positions, a control handle pivoted on the end of said first lever, a second lever pivoted on said handle at a point spaced from said first lever, a crank fixedly pivoted on said valve and connected to said second lever for operation thereby, the end of said lift control valve rod being connected to said crank for operation thereby, and a return conduit from said return passage to the inlet of said pumps.

11. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, a drive wheel rotatably mounted on said truck, a hydraulic motor, means to drive said wheel from said motor, conduits connecting said pumps to said motor and said lift cylinder, a control valve on said base and connected in said conduits to control the operation of said motor and said lift cylinder, said valve having a first inlet passage connected to a first of said pumps and a second inlet passage connected to the second of said pumps, a direction control valve rod slidable in said valve and intersecting said first inlet passage, two supply passages selectively connectable to said first passage by movement of said first valve rod to its oppositely actuated positions and connected by two of said conduits to opposite sides of said motor to oppositely drive said motor, a speed control valve rod slidably mounted in said valve in spaced parallel relation to said first rod and intersecting said second passage, a connecting passage in said valve opened to said first inlet passage ahead of said first valve rod in oppositely actuated positions of said speed control valve rod, a return passage in said valve connected selectively by said direction control rod to the opposite supply passage from that opened to the first inlet passage by said direction control valve rod, a lift control valve rod slidably mounted in said valve and intersecting one of said inlet passages, a lift supply passage in said valve selectively connected to said one of said inlet passages and said return passage by actuation of said lift control valve rod, said lift supply passage being connected to said lift cylinder, a first lever pivotally connected at spaced points to the outer ends of said direction control and speed control valve rods and extending therebeyond, said lever extending on the opposite side of said direction control rod from said speed control rod whereby swinging motion of said lever will reciprocate first said direction control valve rod and will oppositely reciprocate said speed control valve rod after said direction control valve rod has moved to the limit of its actuated positions, a control handle pivoted on the end of said first lever, a second lever pivoted on said handle at a point spaced from said first lever, a crank fixedly pivoted on said valve and connected to said second lever for operation thereby, the end of said lift control valve rod being connected to said crank for operation thereby, and a return conduit from said return passage to the inlet of said pumps.

12. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, a drive wheel rotatably mounted on said truck, a hydraulic motor, means to drive said wheel from said motor, conduits connecting said pumps to said motor and said lift cylinder, a control valve on said base and connected in said conduits to control the operation of said motor and said lift cylinder, said valve having a first inlet passage connected to a first of said pumps and a second inlet passage connected to the second of said pumps, a direction control valve element movable in said valve and intersecting said first inlet passage, two supply passages selectively connectable to said first passage by movement of said first valve element to its oppositely actuated positions and connected by two of said conduits to opposite sides of said motor to oppositely drive said motor, a speed control valve element movable in said valve and intersecting said second passage, a connecting passage in said valve opened to said first inlet passage ahead of said first valve element in oppositely actuated positions of said speed control valve element, a return passage in said valve connected selectively by said direction control element to the opposite supply passage from that opened to the first inlet passage by said direction control valve element, a lift control valve element movably mounted in said valve and intersecting one of said inlet passages, a lift supply passage in said valve selectively connected to said one of said inlet passages and said return passage by actuation of said lift control valve element, said lift supply passage being connected to said lift cylinder, a direction control rod slidably mounted on said valve and connected to actuate said direction control valve element, a speed control rod slidably mounted on said valve in spaced parallel relation to said direction control rod and connected to actuate said speed control valve element, a lift control rod slidable on said valve and connected to actuate said lift control valve element, a first lever pivotally connected at spaced points to said direction control and speed control rods and extending therebeyond, said lever extending on the opposite side of said direction control rod from said speed control rod whereby swinging motion of said lever will reciprocate first said direction control rod and will oppositely reciprocate said speed control rod after said direction control rod has moved to the limit of its actuated positions, a control handle pivoted on the end of said first lever, a second lever pivoted on said handle at a point spaced from said first lever, a crank fixedly pivoted on said valve and connected to said second lever for operation thereby, the end of said lift control rod being connected to said crank for operation thereby, and a return conduit from said return passage to the inlet of said pumps.

13. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, a drive wheel rotatably mounted on said truck, a hydraulic motor, means to drive said wheel from said motor, conduits connecting said pumps to said motor and said lift cylinder, a control valve fixed relative to said base and connected in said conduits to control the operation of said motor and said lift cylinder, said valve having a first inlet passage connected to a first of said pumps and a second inlet passage connected to the second of said pumps, a direction control valve element movable in said valve and intersecting said first inlet passage, two supply passages selectively connectable to said first passage by movement of said first valve element to its oppositely actuated positions and connected by two of said conduits to opposite sides of said motor to oppositely drive said motor, a speed control valve element movably mounted in said valve and intersecting said second passage, a connecting passage in said valve opened to said first inlet passage ahead of said first valve element in oppositely actuated positions of said speed control valve element, a return passage in said valve connected selectively by said direction control element to the opposite supply passage from that opened to the first inlet passage by said direction control valve element, a lift control valve element movably mounted in said valve and intersecting one of said inlet passages, a lift supply passage in said valve selectively connected to said one of said inlet passages and said return passage by actuation of said lift control valve element, said lift supply passage being connected to said lift cylinder, a first lever pivotally connected at spaced points to said direction control and speed control valve element and extending therebeyond, springs biasing said control valve elements to neutral position, one of said springs being stronger than the other whereby swinging motion of said lever will actuate first said direction control valve element and will oppositely actuate said speed control valve element after said direction control valve element has moved to the limit of its actuated positions, a control handle pivoted on the end of said first lever, a second lever pivoted on said handle at a point spaced from said first lever, a crank fixedly pivoted on said valve and connected to said second lever for operation thereby, said lift control valve element being connected to said crank for operation thereby, and a return conduit from said return passage to the inlet of said pumps.

14. In a power driven truck, a base, an internal combustion engine on said base and having a pair of hydraulic pumps drivingly connected to the engine to be driven thereby, a load platform adjustably mounted on said truck, a hydraulic lift cylinder connected to elevate said platform, a drive wheel rotatably mounted on said truck, a hydraulic motor, means to drive said wheel from said motor, conduits connecting said pumps to said motor and said lift cylinder, a control valve connected in said conduits to control the operation of said motor and said lift cylinder, said valve having a first inlet passage connected to a first of said pumps and a second inlet passage connected to the second of said pumps, a direction control valve element movable in said valve and intersecting said first inlet passage, two supply passages selectively connectable to said first passage by movement of said first valve element to its oppositely actuated positions and connected by two of said conduits to opposite sides of said motor to oppositely drive said motor, a speed control valve element movably mounted in said valve and intersecting said second passage, a connecting passage in said valve opened to said first inlet passage ahead of said first valve element in oppositely actuated positions of said speed control valve element, a lift control valve element movably mounted in said valve and intersecting one of said inlet passages, a lift supply passage in said valve selectively connected to said one of said inlet passages by actuation of said lift control valve element, said lift supply passage being connected to said lift cylinder, a first lever pivotally connected at spaced points to said direction control and speed control valve elements and extending therebeyond, springs biasing said control valve elements to neutral position, one of said springs being stronger than the other whereby swinging motion of said lever will actuate first said direction control valve element and will oppositely actuate said speed control valve element after said direction control valve element has moved to the limit of its actuated positions, a control handle pivoted on the end of said first lever, a second lever pivoted on said handle at a point spaced from said first lever, a crank fixedly pivoted on said valve and connected to said second lever for operation thereby, said lift control valve element being connected to said crank for operation thereby, and a return conduit from said return passage to the inlet of said pumps.

15. The combination set forth in claim 14 wherein said handle has a throttle control lever mounted thereon in gripping relation to the handle and connected to the throttle of said engine.

16. The combination set forth in claim 14 wherein there is a spring pressed check valve opening between said inlet passages and biased to close against the pressure in the second inlet passage to open when said truck drives said motor and tends to draw more fluid than the output of the first of said pumps.

17. In a power driven truck, a base, an internal combustion engine on said base and having a pair of hydraulic pumps drivingly connected to the engine to be driven thereby, a drive wheel rotatably mounted on said truck, a hydraulic motor, means to drive said wheel from said motor, conduits connecting said pumps to said motor, a control valve connected in said conduits to control the operation of said motor, said valve having a first inlet passage connected to a first of said pumps and a second inlet passage connected to the second of said pumps, a direction control valve element movable in said valve and intersecting said first inlet passage, two supply passages selectively connectable to said first passage by movement of said first valve element to its oppositely actuated positions and connected by two of said conduits to opposite sides of said motor to oppositely drive said motor, a speed control valve element movably mounted in said valve and intersecting said second passage, a connecting passage in said valve opened to said first inlet passage ahead of said first valve element in oppositely actuated positions of said speed control valve element, a first lever pivotally connected at spaced points to said direction control and speed control valve elements and extending therebeyond, springs biasing said control valve elements to neutral position, one of said springs being stronger than the other whereby swinging motion of said lever will actuate first said direction control valve element and will oppositely actuate said speed control valve element after said direction control valve element has moved to the limit of its actuated position, and a return conduit from said return passage to the inlet of said pumps.

References Cited in the file of this patent
UNITED STATES PATENTS

| | | |
|---|---|---|
| 2,228,411 | Sheridan | Jan. 14, 1941 |
| 2,320,600 | Howell | June 1, 1943 |
| 2,345,224 | Upp | Mar. 28, 1944 |
| 2,443,480 | Schwitzer et al. | June 15, 1948 |
| 2,456,320 | Repke | Dec. 14, 1948 |
| 2,598,865 | Turner | June 3, 1952 |